Jan. 4, 1966 C. LYNN PETERSON ETAL 3,227,281
FILTER MEDIUM
Filed Nov. 6, 1961 6 Sheets-Sheet 1

Fig.1

FORCES ON MEDIUM

Fig.2

FORCE ON MEDIUM

Fig.3

INVENTORS.
John G. Peterson
C. Lynn Peterson
BY

ATTORNEYS

INVENTORS.
John G. Peterson
C. Lynn Peterson

INVENTORS.
John G. Peterson
C. Lynn Peterson

Jan. 4, 1966   C. LYNN PETERSON ETAL   3,227,281
FILTER MEDIUM
Filed Nov. 6, 1961   6 Sheets-Sheet 6

INVENTORS.
John G. Peterson
C. Lynn Peterson
BY
ATTORNEYS

United States Patent Office 3,227,281
Patented Jan. 4, 1966

1

3,227,281
FILTER MEDIUM
C. Lynn Peterson and John G. Peterson, both of Salt Lake City, Utah, assignors to Peterson Filters and Engineering Company, Salt Lake City, Utah, a corporation of Utah
Filed Nov. 6, 1961, Ser. No. 150,575
6 Claims. (Cl. 210—499)

This invention relates to a filter medium of optimum configuration.

Rotary drum filters are commonly used in the art of separating solids from liquids. A number of different types of drum filters have found widespread use in all types of industry. Two of the more common types are the "fixed filter medium or cloth" drum filter and the "continuous filter medium removal" drum filter, for example as described in copending application Serial No. 71,464, filed November 25, 1960, for "Filter Medium Tracking Control," now Patent No. 3,120,492, issued Feb. 4, 1964. The fixed cloth drum filter utilizes a filter medium or filter cloth which is secured to the peripheral deck of the drum filter, usually by a wire winding over it, and filter cake which is picked up from a slurry is blown and/or scraped from the surface of the filter medium. In the continuous filter medium removal type, an endless strip of cloth or filter medium, which has a length substantially greater than the peripheral surface of the drum, is looped over the drum and through a discharge section which is spaced from the surface of the drum. That portion of the loop of the filter medium over the drum utilizes the same basic principles of continuous filtration, where in the filter medium in the slurry is subjected to suction from the interior of the drum, and this suction continues beyond where the filter medium contacts the slurry. During contact with the slurry, liquid is drawn through the filter medium and the perforate deck of the drum for discharge into a filtrate tank while the cake remains on the filter medium. The filter medium passes from the periphery of the drum to the discharge section where the cake is removed; the filter medium may then be cleaned and returned to the drum for the continuous operation of the filter.

In many applications the continuous filter medium removal type of drum filter has distinct advantages over the fixed filter medium type, however, maintaining the filter medium in proper alignment (sometimes called tracking) on the filter drum and in the discharge section is a difficult problem. As the size of the filter increases tracking generally becomes more of a problem. Since the filter medium is not secured to the surface of the drum, it is free to move laterally on the drum if there is a tendency for the medium to fail to correctly track. Control or maintaining the filter medium centered on the machine has been attempted in many different ways, and it is an object of the invention to provide a novel medium which affords a simplified control for maintaining proper alignment or tracking of the filter medium on a rotary filter of the continuous filter medium removal type.

Some of the principal components of the continuous filter medium removal rotary drum filter system include: (1) a filter drum, which may be a conventional perforate deck filter drum having conventional components for applying suction to a portion of the drum periphery, etc.; (2) an endless strip of filter medium or filter cloth which is substantially longer than the peripheral surface of the filter drum and has a center which is longer than the sides or edges; (3) a symmetrical filter medium; (4) a tracking beam on which a tension producing roller is suspended; (5) a filter medium return roller over which

2 the filter medium passes as it is returned to the drum periphery; (6) means for neutralizing the uneven tension forces in the filter medium which arise from the filter medium configuration; and (7) certain conditions require a dampening of the tracking beam to cancel out undesirable weight shifts in a tension roller mounted on the tracking beam. Under certain conditions another roller may be utilized, a filter medium removal unit, for cake discharge, however, this does not function in the tracking system. Proper control of the filter medium depends on a balance of the tracking forces, which are created on either side of a vertical plane of symmetry through the center of the system. The system directs the tracking forces outwardly from the vertical plane of symmetry thus exerting a spreading action on the filter medium, and provides a simplified tracking system for control of the filter medium.

A further object of the invention is to provide a novel filter cloth construction which permits positive control over the tracking forces in a continuous cloth removal rotary drum system.

A still further object of the invention is to provide a filter cloth in which its stretch forces are balanced and it provides means for accurately tracking the filter cloth on a continuous filter medium removal rotary drum filter.

These and other objects and advantages of the invention may be readily ascertained by referring to the following description and appended drawings in which.

For illustration of the general system, one particular form is used, however, the system is applicable to other forms as is set out below.

Figure 1:
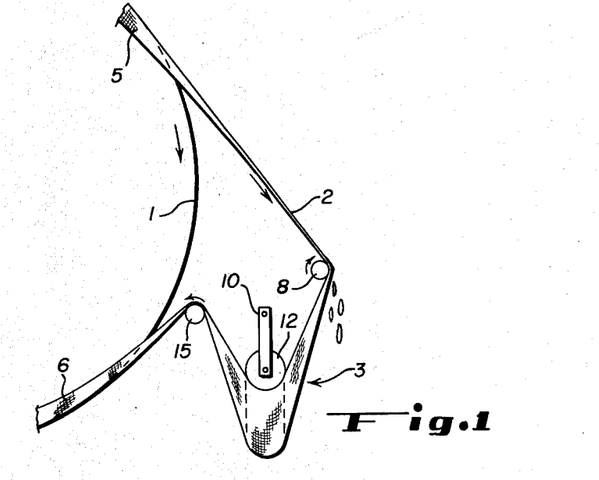
FIG. 1 is a schematic view of a rotary drum filter of the continuous filter medium removal type including a discharge section of the system.

In the device illustrated in FIG. 1 a rotary drum 1 is mounted, according to conventional practices, in a slurry tank for rotation therein, the slurry tank not being shown, and a loop of filter medium 2 is looped over the drum and through a discharge section, shown in general by numeral 3. The filter medium is preferably wider than the width of the drum and laps over the ends of the drum as at 5 and 6. The discharge section includes a rod or roller 8 over which the filter medium 2 passes, and normally it is at that point where the filter cake is discharged from the filter medium. The rod 8 may be a rotary rod or a stationary rod, depending on the particular use. A balance beam 10 is pivotally mounted on a center pivot point 11, and a flexible tensioning roller 12 is rotatably mounted on the beam 10. A back roller 15 is rotatably mounted adjacent the periphery of the drum and is arranged to guide the filter medium from the discharge section onto the periphery of the drum. This back roller is adjustable as to height and angle in relation to its axis and the axis of the drum.

The flexible roller 12 is rotatably mounted from its ends and hangs in a curve from the balance beam 10 and this imparts a downward convex surface or belly to the filter medium under the roller.

This downward convex surface creates outwardly opposed forces on the cloth, and these forces are generally outwardly opposed from the vertical plane of symmetry of the drum filter. Due to the downward convexity of the fluid tension roller, as shown in FIG. 2, its axis of rotation is a curve rising upwardly on both sides from the vertical plane of symmetry.

Figures 2, 3:
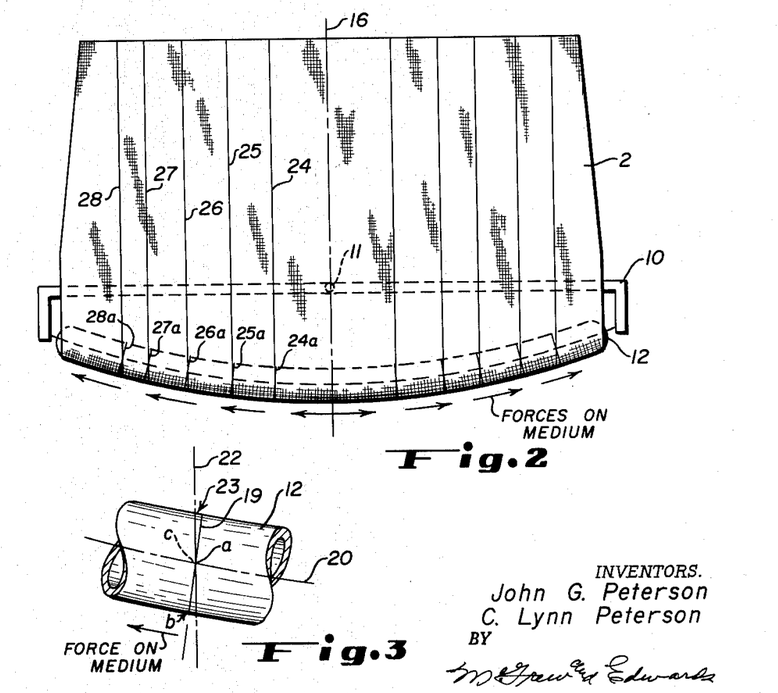
FIG. 2 is a schematic view illustrating the primary forces involved in tracking a filter medium in the discharge section of a continuous filter medium removal filter.
FIG. 3 is an enlarged detail of a section of a flexible tensioning roller, according to the invention, illustrating in detail the relation between a section of the tensioning roller and filter medium.

As shown in the fragmentary detail of FIG. 3, a line 19 around the circumference of the tension roller represents an intersecting plane perpendicular to the axis 20 of the roller at point "a." This is called a "roll line" through point "a." A strip line is a line resulting from a point on the filter medium running essentially parallel with the vertical plane of symmetry through the device, for example, strip line 22 of FIG. 3. Since the roll lines are perpendicular to the axis of rotation at a particular point along the flexible tension roller, they generally slant downwardly and outwardly from the lowermost point on the tension roller, through which passes the vertical plane of symmetry, to the outer end of the roller and extending outwardly on each side. The roll line therefore forms an angle with the strip lines of the filter medium, and this angle is referred to as the helix angle, and is in a direction such that there is exerted an outward or spreading force on the filter medium, shown by the arrows below the tension roller in FIG. 2. The outwardly opposed forces are dependent on the convexity of the flexible roller, and in turn the convexity of this flexible roller is dependent on the characteristics of the filter medium that supports the roller. As shown in FIG. 2, a series of such strip lines 24 through 28, inclusive, is shown extending outwardly toward the left from the vertical plane of symmetry 16. The roll lines are shown by numbers 24a through 28a. There are, of course, an infinite number of sets of strip lines and roll lines, and only a few are shown. In most instances, the filter medium will be looped around the tension roller so as to have contact over the area represented by points a, b and c and along the length of the roller. The forces acting on the filter medium are distributed throughout the contact area.

Since the outwardly directed forces are dependent on the convexity of the flexible tension roller, and the convexity of the roller is dependent on the characteristics of the filter medium, the filter medium itself is an integral part of is own control system of tracking.

To provide the tension roller with the downward convexity, the cloth must be fabricated with its center longer than the sides or edges, which is referred to herein as "pointing" the filter medium. For material which has essentially no stretch, the filter medium must be provided with pointing in fabrication since it simply will not stretch on the drum filter. Cloths, for example, which have a twill weave, that is, the weave runs at an angle to the length of the cloth are difficult to track because they do not stretch evenly in the same direction across the width of the cloth. This result is uneven spreading forces acting on the cloth and causes complete loss of tracking control.

To provide proper convexity of the flexible tension roller the endless strip of filter medium itself sometimes cannot be made from a truly rectangular filter medium that does not stretch in the middle in operation and thus point itself. The filter medium of the invention is made with its longitudinal center longer than the longitudinal sides which "points" the filter medium. Thus the point of a filter medium is the length of the center beyond the length of the two sides. The convexity of the flexible roller may, thus, be controlled by the amount of point of the filter medium. Several systems of fabrication and determining the amount of point of a filter medium are explained in detail below.

In fabrication of a filter medium, in many instances, several panels of cloth must be sewn together to make the filter cloth wide enough for use on the filter drum. Many filter cloths are twill weave and we have discovered that the twill weave cloth must be constructed in such a manner that the twill weave runs oppositely in adjacent panels so that the cloth will stretch evenly when wet and under the weight of the tension roller, to thereby provide effective tracking of the fiter cloth on a continuous cloth removal drum filter. The twill weave cloth is fabricated such that the weave is run in opposite directions on either side of the plane of symmetry (the sewn joining seam) where only two panels of the cloth are used. Where more panels are used the weave direction is balanced across the width of the completed filter cloth, the direction of the weave of adjacent panels being directed in opposed direction.

Figures 5, 6:
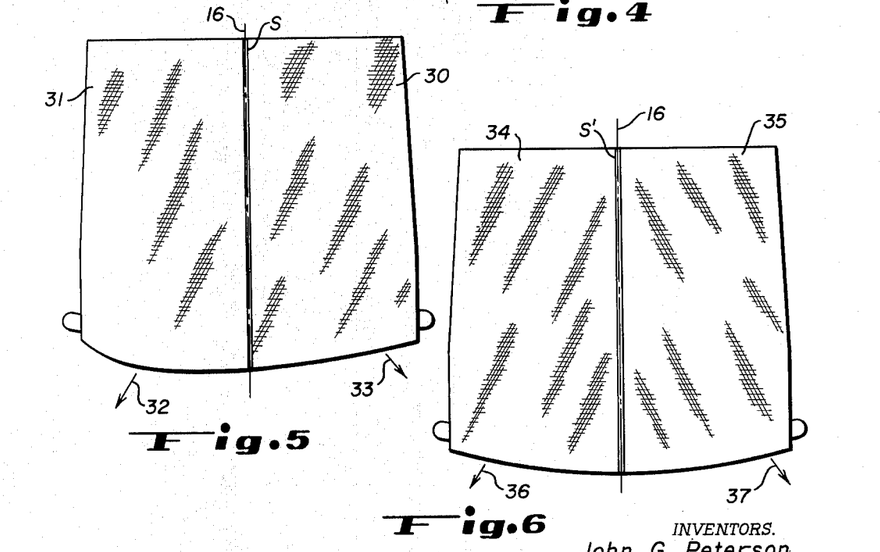
FIG. 5 is a schematic elevational view of a filter cloth showing a configuration caused by uneven stretch of an unsymmetrical cloth when tension is applied.
FIG. 6 is a schematic elevational view of a filter cloth, made according to the invention, when tension is applied to a symmetrical filter medium.

In the cloth illustrated in FIG. 5, the weave of section 30 runs in the same direction as the weave of section 31 and the unbalanced stretch force is shown by the bulge and indicated by the larger arrow 32 as against the stretch force shown by the shorter arrow 33 on the opposite side of the plane of symmetry 16, assuming the seam S is along the line 16. The filter cloth configuration of FIG. 6 has panels 34 and 35 sewn along the seam S' and the weave of each panel is run in an opposite direction outwardly from the vertical plane of symmetry 16. In this instant, the forces, when the roller is suspended in a loop of the filter cloth, are essentially equal as shown by the arrows 36 and 37 of equal length.

Figure 4:
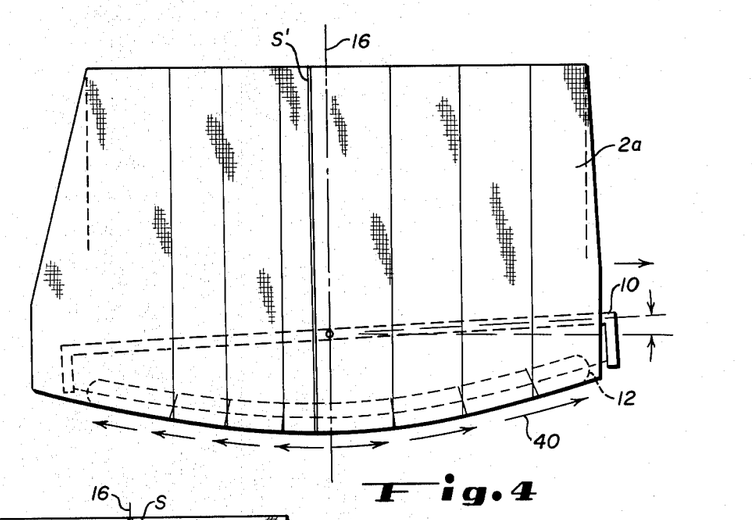
FIG. 4 is a schematic side elevational view of a filter medium discharge section of a filter system illustrating the forces involved on a filter medium which is off center in operation of the filter medium.

With the filter medium of proper configuration, such as illustrated in FIG. 6, with the weave in opposite directions for balanced stretching, the spreading forces involved with the different helix angles, are illustrated in FIG. 4 as employed for tracking control. The filter cloth 2a is shown misaligned to the left of the vertical plane of symmetry 16 through the system (off center to the left), and is exaggerated for clarity.

The filter cloth center seam S' is shown to the left of the vertical plane of symmetry 16 of the system. The cloth lifts the right end of the flexible tension roller 12 and lowers the left end. As this roller is mounted on the tilting beam 10 but held against lateral movement, it tilts so as to adjust itself with the cloth. With the roller so tilted, the helix angles on the right are greater than those on the left of center line. The spreading forces still exist on both sides but are now unbalanced, the greater forces 40 acting toward the right due to the increased helix angles on that side. The resultant of these unbalanced forces acting toward the right is to move the cloth to the right. Where a cloth is tracking with little deviation, a move to the left, for example, causes more lifting force on the right and less on the left of the roller. Since the spreading forces are proportional to the pressure or tension on the roller, a corrective force is created by this increased contact pressure on the right side of the roller before any significant change in helix angle or beam tilt occurs.

In actual operation the cloth will generally oscillate slowly about the center of the system. Under normal conditions of uniform operation the cloth will normally start oscillating about the center of the system and tend to come to rest at or near the center. However, if continual external disturbances are present, such as variations of filter feed temperature, drum speed, etc., the cloth will continually oscillate or hunt its neutral point, which point is near the vertical plane of symmetry of the system.

The tracking beam 10, of course, permits tilting of the flexible roller and the cloth lifts one end and lowers the other. Since the flexible roller is rotatably mounted in the tracking beam, the roller is restrained in a lateral direction and the cloth is the element that moves.

As described above, for proper tracking, the filter cloth should be pointed. The optimum amount of point, the amount of difference between the center and the edges, can only be determined by actual operation of a particular filter cloth on the particular filter. It is known that to dress a drum filter with a filter cloth is a relatively time consuming operation, especially the larger sizes of filters.

When a filter cloth has not tracked satisfactorily, it has to be repointed. Where it is necessary to change the point for proper tracking, considerable time is lost in drying the cloth so it may be resewn with the proper point. By providing a two-part filter medium, however, it is possible to determine the proper point of the filter medium without removal of the entire medium from the unit and without drying the entire cloth. This two-part filter medium, also, provides an economical method of determining the proper configuration of the filter medium or cloth for correct tracking.

Figure 12:
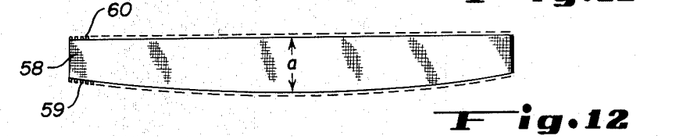
FIGS. 12, 13 and 14 are plan views of three connecting systems, for interconnecting the ends of a filter medium body of FIG. 11.
Figure 13:
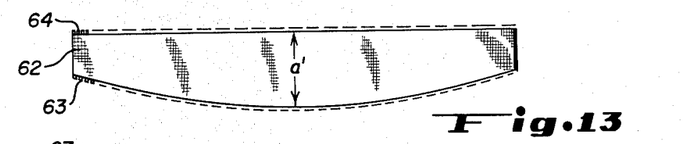
Figure 14:
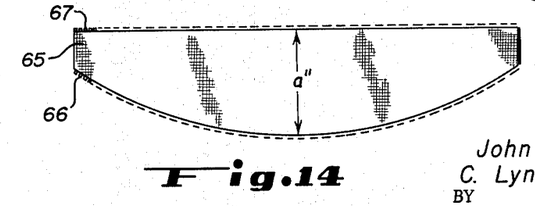

The two-part filter medium comprises a filter medium body 50, which may be made of a plurality of panels such as 51 through 54, sewn together along respective edges to form the main body of the filter medium. The body has a length X, which is less than that necessary for operation of the filter on which it is used. The width Y is as wide as necessary for proper operation, and in the continuous filter medium removal filters this width is normally slightly wider than the width of the drum on which it is used. One part of a slide fastener (zipper) is sewn or otherwise secured on each end, 56 at the lower end and 57 at the upper end, so that an intermediate section or connector may be secured therebetween to form a continuous loop of the filter medium. Three such connectors are shown in FIGS. 12–14. In FIG. 12 an interconnecting section 58 is illustrated with a point, represented by the distance "a," which provides a shallow curved edge. In this configuration the arcuate edge 59 has a large diameter. Both edges 59 and 60 include one part of a slide fastener so that it may be attached to the ends of main body 50 of the filter medium forming an endless loop. The connector of FIG. 13 includes a panel 62, having upper and lower edges 64 and 63, respectively, and a point represented by a distance a' which is larger than the distance "a" of FIG. 12. When attached to the body 50 it provides a filter medium having a point which is slightly longer, and therefore forms a deeper belly under the flexible tension roller, than the one formed by the connector of FIG. 12. A still deeper point is provided by a device at the configuration of FIG. 14 wherein the body 65, having upper and lower edges 67 and 66, utilizes a point represented by the distance a''. When connected in the body 50 to form a loop, the filter medium has a center portion which is substantially longer than the edges and forms a deep belly under the flexible tension roller.

In starting up a filter, according to the invention, a filter medium body 50, of the desired material, is made with a length slightly less than that necessary for operation of the filter medium on the filtering device. Three or more interconnecting units, FIGS. 12 through 14, are provided. Normally on initially dressing the filter a connector with the smallest point would be attached to the ends of the body 50 to form the continuous loop. This provides a filter medium with the smallest point. After operating for a period of time to ascertain the action of the filter medium on the filter during actual filtering operation, the section 58 may be removed, when necessary, and the next section with the next point is inserted in its place without removing the main body of the filter medium 50. Again by operating the filter medium, the action of the filter medium with the particular point may be determined. Likewise, a section of still deeper point may replace the section to determine the action of the filter with a filter medium of that configuration. By using the various interconnectors the optimum configuration of the filter medium may be determined without completely dressing and redressing the filter each time the cloth is desired to be changed. After determining the point of desired configuration, subsequent filter media for the filter may be made with the desired point, or with a modified configuration referred to as a "conical cloth." In this connection it is noted that the test cloth is not intended for production but merely for initial filter operation to determine the proper operating characteristics for that particular cloth weave.

The connectors have been shown as a single piece of material. It is to be understood, however, that they may be made with the same number of strips as the main body, so as to maintain symmetrical stretch characteristics throughout the filter medium.

Figure 18:
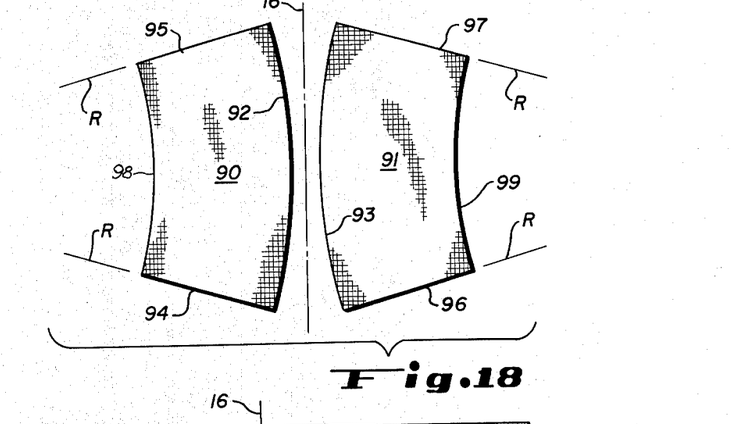
FIG. 18 is an exploded view of a modified filter medium according to the invention.

A modified filter cloth, shown in exaggerated dimensions in FIG. 18, is made of two "conical" cloth layouts wherein one section 90 includes an arcuate edge 92 at one side and a smaller arcuate edge 98 on the other side. The two ends of the cloth 94 and 95 are laid out on a radius R so that the section is a developed truncated conical section. The opposite section 91 includes an arcuate outer edge 93, an inner edge 99 and two ends 96 and 97 are laid out on the radius lines R. The filter cloth is assembled by sewing the edges 92 and 93 together forming a seam which becomes the longitudinal center line of the filter cloth. This central seam is longer than the side edges 98 and 99. A part of a zipper is attached to the now joined edges 95 and 97, and the other zipper part is connected to the opposite joined edges 94 and 96. These two edges may then be secured together, forming an endless loop of filter medium.

The filter medium formed from the parts of FIG. 18 provide a filter medium having a built-in "point". This point may be predetermined by lengthening or retracting the radius lines which form the ends of each panel of the medium. The fabricated medium in this instance is termed a filter medium having a "conical point". One advantage of a filter cloth made in this manner is that the extra material, or point, is evenly distributed along the entire length of the filter medium. This results in fewer wrinkles occurring at the joints including the connector piece where the ends of the filter medium are fastened together. Wrinkling at the joint is caused by the length variation concentrated at the joined ends of the medium.

The elastic properties of the filter medium vary from type to type, and even in various parts of the same medium. By controlling the alignment of the back roller 15, FIG. 1, which feeds the filter medium back onto the drum, it is possible to provide proper tracking. The back roller 15 may be journaled in bearing sets 80 at each end thereof, and the bearing set is vertically adjusted by means of a stud and nut combination 81 which is mounted on a support plate 82. Thus the back roller may be tilted from either end by the adjustment. By this means the undesirable length variations of the filter medium may be compensated by the back roller. It is noted that generally a filter cloth used on such filters actually stretches and many times it stretches unevenly. It is this stretch that the adjustable roller compensates. The adjustable back roller allows a larger tolerance in cloth fabrication, for example, a cloth with one side slightly shorter would have that much less stretch during operation, but normal tracking is obtained by merely tilting the back roller to compensate for the shorter side. The back roller then provides a zeroing or calibrating device for adjustment which is necessary each time a new filter cloth is installed on the system. The adjustment of the back roller is used in combination with the tiltable tension roller, and in combination compensate for variance in stretch of the cloth, and for variance caused by fabrication of the cloth which shifts the cloth from a neutral tracking position about the vertical plane of symmetry.

Tracking control is not dependent on a gravity type tension roller, such as the flexible roller described above, but other types of rollers may be used. The tension in the filter medium is maintained, in one form, by weighing a hollow roller with water. In another form a solid flexible roller provides the tension. This retains filter medium tension regardless of length variations of the filter medium. The tension may, also, be provided by spring loading the beam pivot point in a vertical direction.

Figure 7:
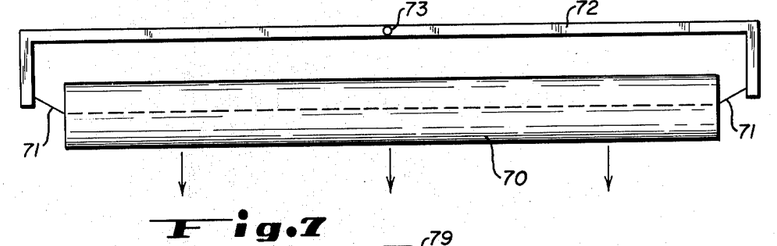
FIG. 7 is a schematic elevational view of a modified tensioning roller.

The device of FIG. 7 utilizes a weighted, rigid, hollow roller 70, suspended on a cable 71. The cable 71 is secured to a tiltable beam 72 having a fixed pivot 73. The roller preferably is journalled in bearing sets (not shown) mounted on the cable as in conventional practices to prevent wear of the cable. The roller may, also, be solid, to provide a weighted roller for tensioning the filter medium. This provides a rigid gravity roller with sufficient freedom of the roller to maintain tension on the filter medium and still be tiltable.

Figure 8:
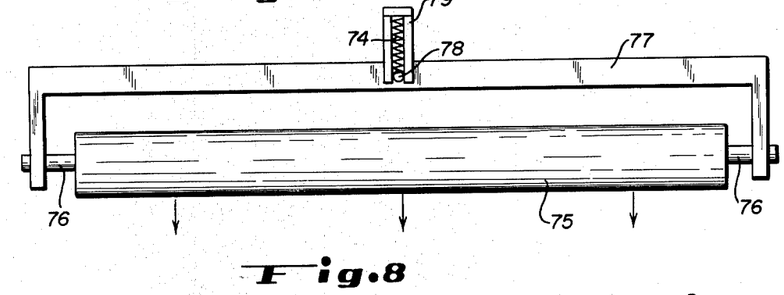
FIG. 8 illustrates another modified tensioning roller according to the invention, showing, schematically, a spring-loaded light-weight tensioning roller.
Figure 9:
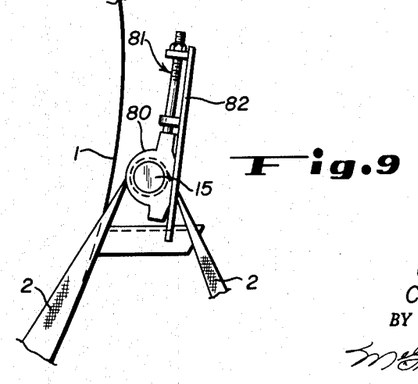
FIG. 9 is an end view of the back roller arranged for adjustably placing the filter cloth on the peripheral surface of the drum.
Figure 10:
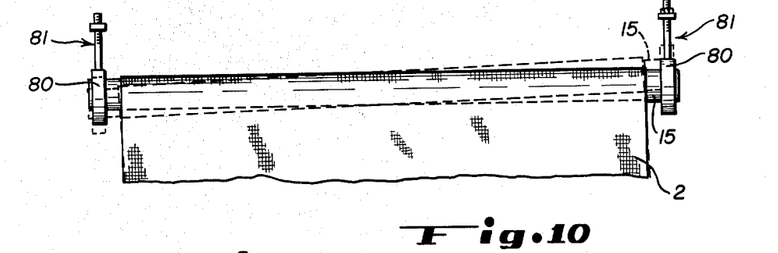
FIG. 10 is a front elevation of the back roller of FIG. 9.
Figure 11:
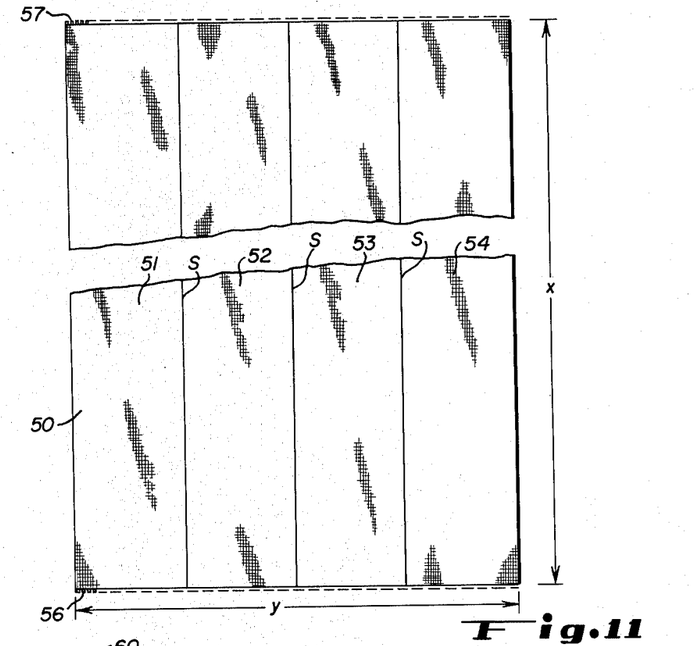
FIG. 11 is a plan view of a filter medium body, according to the invention, with a configuration for determining optimum tracking on a filter system.

A rigid, lightweight roller 75, FIG. 8, may be journalled on stub shafts 76 which are mounted in beam 77. In this instance, the roller is rigid with the tiltable beam 77. The beam is pivotally mounted on floating pivot 78 in frame 79. A compensating spring 74 pressing on the pivot 78 exerts tension on the cloth and allows the roller to adjust itself to variations in cloth length. By supporting the pivot on the piston of a hydraulic cylinder, a constant tension force could be applied to filter medium under the influence of the spring 74.

Figure 19:
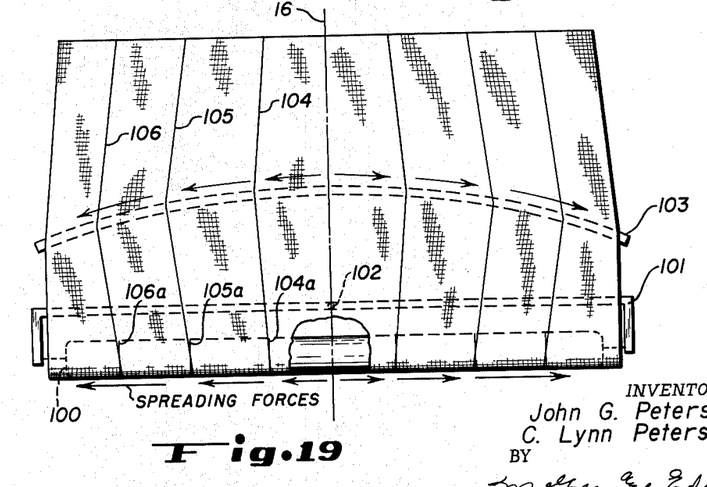
FIG. 19 is a schematic front elevation of a modified filter according to the invention using a rigid tension roller and a bow rod to effect spreading of the filter medium.

The spreading forces imposed on the filter medium by a bow rod is shown in FIG. 19. In this modification a rigid roller 100 is mounted in a tiltable beam 101 which is pivoted on pivot 102. It is noted that with the rigid roller there is no downward convexity in the pointed filter medium, therefore, no helix angles and no spreading action. A bow rod 103 mounted above the beam bears against the filter medium to make it bulge outwardly. The strip lines 104, 105 and 196 are bent by the bow rod so that they approach the roll lines 104a, 105a and 106a at an angle which is analogous to the helix angles with a flexible tension roller. The action of the bow rod is due to the fact that the cloth tends to slide outwardly from the top of the hump at the center of the rod toward the sides spreading the cloth. Thus the strip lines are parallel to the vertical plane of symmetry above the bow rod, and converge below it.

The bow rod is preferably adjustably positioned so it may be turned toward the filter cloth for more bow or away from the filter cloth to reduce the cloth bulge. This provides an added advantage in change of spreading forces by a simple adjustment. Once the rigid roller is tracking near its neutral position there is little or no oscillation, however, changes created by drum speed, filter feed temperature, etc. are readily compensated.

During operation of the continuous filter medium removal drum filter, such as described above, certain uneven tension forces are created in the medium itself. Some of the uneven forces arise from the fact that the filter medium is longer in the center than at its edges. The peripheral speed of points on any line drawn laterally across the medium is essentially the same, but any point near the center of the medium has a longer distance to travel than a corresponding point at the edge. The result of this is that a point near the center continually lags behind a corresponding point on the edge. This results in the creation of forces which tend to draw the edges of the cloth toward the longitudinal center of the cloth and wrinkles it. The wrinkling effect of these forces is effectively overcome by the spreading action of the flexible tension roller. It has been found, however, that to obtain a stable control system these forces must be neutralized, not merely overcome. These forces cause an instability in the control system since their existence results in a non-uniform longitudinal tension across the width of the filter medium. This non-uniform tension in the filter medium is readily apparent during operation, and its detrimental effect on the tracking control occurs during what might be called the "free travel" of the medium. The free travel is the distance between the point where the filter medium leaves the filter drum to the point where it makes contact with the fluid tension roller and is, in many cases, suspended between those points. If the longitudinal tension across the width of the medium is not essentially uniform when it contacts the tension roller, the tension roller cannot perform its function in the precise tracking of the filter medium.

In order to neutralize these uneven forces and their undesirable effect on control, the filter medium must be allowed to shift within its own plane. Since the center portion of the filter medium is longer than the edges, either the center of the medium must be permitted to move forward with respect to the edges or the edges must be allowed to move backward with respect to the center. During the free travel of the medium this neutralization or shifting is most easily accomplished. At any other portion of the travel of the filter medium throughout the system neutralization would be more difficult since slippage or shifting of the filter medium would have to occur on one of the revolving elements. Since the filter medium is maintained under tension and the contact between the filter medium and any of the revolving elements is quite secure, such shift would be difficult, if not impossible.

Figure 15:
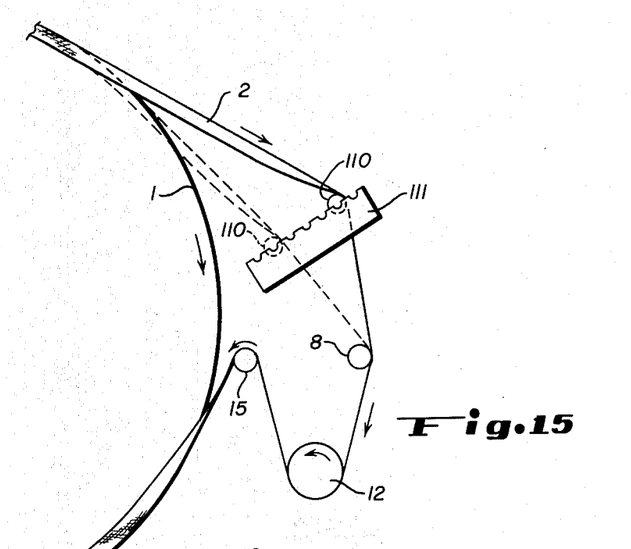
FIG. 15 is a side elevational schematic view of a modified filter according to the invention, illustrating an adjustable drag on the filter medium.
Figure 16:
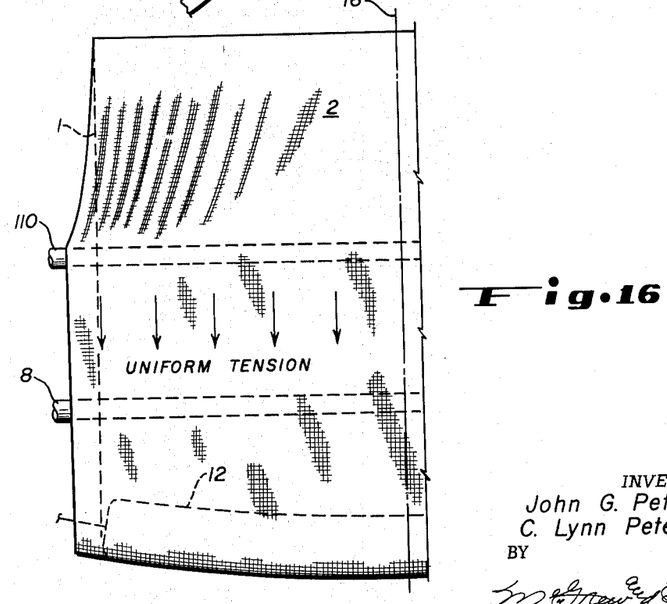
FIG. 16 is a partial front elevational view of the device of FIG. 15.

One effective way of accomplishing the neutralization of the non-uniform tension in the filter medium is to place a drag rod beneath the medium prior to its contact with the tension roller. This produces a drag or backward pull across the entire width of the filter medium. As illustrated in FIG. 15, a rotary drum 1 is mounted in a filter tank and the filter medium 2 is looped over the drum and through a discharge section, as is detailed above. After the filter medium 2 leaves the drum 1 it is passed over a non-rotating drag rod 110 which is mounted at both ends in a notched plate 111 (only one of which is shown) which permits movement of the drag rod 110 to various places of minimum to maximum drag. The rod 110 is a stationary or non-rotating rod, and the filter medium is pulled across the rod and the friction between the medium and the rod creates a drag. This drag created by the rod across the entire width of the filter medium increases tension in areas where tension is low, making the filter medium tension nearly uniform between the drag rod and the tension roller 12. Any error in the lateral positioning of the filter medium 2 is thus effectively transmitted to the flexible tension roller 12.

In filter media constructed as described above, the drag rod increases tension in the areas where tension is low. The areas of low tension are near the edges of the cloth and are evident for a distance of about one-fourth of the medium width inwardly from each edge toward the center. This increase in the tension in these areas actually causes the medium at the edges to back up in relation to the center, thus causing the necessary shift of reorientation of the medium.

The amount of drag necessary to equalize the cloth tension has been found to be dependent on the elastic properties of the medium, which is usually related to the filter medium weight. The variable distance of placement of the drag rod 110 from the drum 1 permits adjustment of the amount of drag on the cloth. The lighter the filter media, generally the most elastic, the greater is the drag required for neutralizing the forces, and the further away the rod 110 is placed from the drum. The amount of drag placed on the filter medium is therefore controlled by the drag rod bearing pressure and the actual speed of the filter medium, which, of course, depends on the drum speed. If a light filter medium is used on the slow speed operation, for example, maximum drag is usually necessary, and the outermost position of the drag rod 110 is the position required. If the filter medium speed is high, however, sufficient drag friction may be produced with the drag rod at the minimum bearing pressure or in the innermost position, as shown in the dashed lines. Changes in the filter medium and the speed are compensated by the medium of the drag rod between the two positions. Other means of varying the rod position will be apparent to those skilled in the art.

Figure 17:
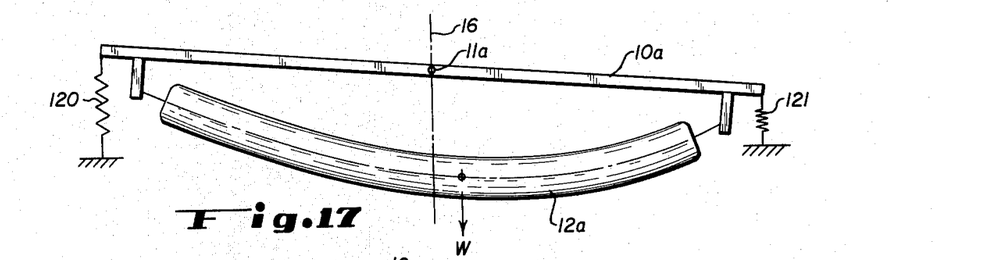
FIG. 17 is a schematic view of the tracking beam and supported flexible roller with one form of dampening means.

In the tracking of the filter cloth using the tilable tension roller, it has been explained above how the lateral movement of the filter medium causes tilting of the tension roller, mounted on the tiltable beam, thus guiding the belt to essentially its neutral position. Changes in the variables of the system, that is, increasing with the width of the drum which makes a heavier tension roller because of increased length, reducing the weight of the filter medium by using lighter weight filter cloths, etc., changes the tracking control. Where a very light cloth is used, for example, on a larger filter, the heavier tension roller and the more elastic filter medium tended to cause overcontrol of the tracking beam. The addition of springs to the ends of the tracking beam to damp the movement of the beam overcomes the overcontrol and overoscillation of the filter medium. As shown in FIG. 17, a spring 120 is mounted at one end and a spring 121 is mounted at the other end of a tracking beam 10a mounted on a pivot 11a. The beam supports a rotatable flexible tension roller 12a. As shown in the drawings, a substantial tip or tilt of the beam 10a moves the center of the weight a substantial distance from the vertical plane of symmetry of the device. With an elastic cloth the beam and roller tilts more than with an essentially non-elastic cloth and the weight shift is more pronounced. The elastic cloth is then unable to cause the shift back to neutral position. The springs 120 and 121 damp the movement and restrain the tracking beam and roller from tilting too far. The springs tend to cancel out the undesirable weight shifts of the tension roller. The springs permit the small normal oscillation of the cloth back and forth on the tension roller, with a slight corresponding tilt or movement of the tracking beam.

It is noted that filter medium supports the tension roller in a loop, and the roller by various means exerts tension on the filter medium. The angle at which the filter medium approaches the tension roller determines the amount of surface of the roller in actual contact with the filter medium. Varying the angle of approach varies the area of contact, and an area of contact extending from about 10° to about 350° of the roller surface is effective for tracking systems. As shown in FIG. 1, the contact area is somewhat less than 90°, and it is obvious that this may be changed by lengthening or shortening the loop of filter medium, etc.

The flexible tension roller has a curved axis, however, it lies in a single plane axially through the roller. An extension of the plane of the approaching filter medium intersects the plane through the roller, and an extension of plane of the leaving filter medium, also, intersects the plane of the roller and on the same line as the intersection of the plane extension of the approaching medium. Where the contact area is greater than 180°, the line of intersection is about the roller, and when less than 180° it is below the roller. At exactly 180°, i.e., the approaching medium planes are parallel, there is no line of intersection.

While the invention has been described with reference to specific embodiments, there is no intent to limit the invention to the precise details, except insofar as defined in the following claims.

We claim:

1. A filter medium for a continuous filter medium removal-type rotary drum filter comprising a plurality of essentially elongated rectangular panels of filter medium, each having at least one of the woof and warp at an angle to the edge thereof, said panels being sewn together in edgewise relation, at least one of the woof and warp in adjacent panels being directed oppositely from the central interconnecting joint therebetween, and means for releasably securing the ends of the filter medium together whereby to form an endless loop.

2. A filter medium for a continuous filter medium removal-type rotary drum filter comprising a plurality of essentially elongated rectangular panels, each having at least one of the woof and warp at an angle to the edge thereof, said panels being sewn together in edgewise relation, at least one of the woof and warp in adjacent panels being directed oppositely from the interconnecting sewn joint therebetween, means for releasably securing the ends of the sewn filter medium together to form an endless loop, and one end of each panel being cut so as to form with joined panels an arcuate end, the other end of each panel being cut so as to form an essentially square end when joined to the other panels.

3. A filter medium for a continuous filter medium removal-type rotary drum filter comprising a plurality of essentially elongated, developed truncated conical panels, said panels being sewn together along their longest side, and means for releasably securing the ends of the sewn filter medium together to form a loop with a center longer than its sides.

4. A filter medium for a continuous filter medium removal-type rotary drum filter comprising a plurality of essentially elongated panels sewn together along their sides in side by side relation forming a single elongated strip, said elongated strip having at least one arcuate end so as to be longer in its center portion than along its edges, and means for releasably joining the ends together to form a loop with a center longer than its sides.

5. A filter medium for a continuous filter medium removal-type rotary drum filter comprising an essentially rectangular body of filter medium of a length slightly less than necessary to form a continuous strip of filter medium, said rectangular body having two essentially straight edges, a connecting member of filter medium having one straight edge and one outwardly curved edge, means for releasably connecting the straight edge of said connecting member to one edge of said rectangular body, and means for releasably connecting the curved edge of said connecting member to the other said edge of said rectangular body forming a continuous loop of filter medium having a center which is effectively longer than the sides thereof.

6. A filter medium according to claim 4 in which the fastening means for connecting said connecting member to said rectangular body of filter medium is a slide fastener.

References Cited by the Examiner

UNITED STATES PATENTS

| | | |
|---|---|---|
| 1,612,873 | 1/1927 | Mauss. |
| 1,927,849 | 9/1933 | Roberts _________ 226—192 X |
| 2,812,064 | 11/1957 | Siebenthal _______ 210—401 X |
| 2,846,051 | 8/1958 | Craggs et al. _______ 198—139 |
| 2,916,767 | 12/1959 | Stevens ___________ 26—63 X |
| 3,012,301 | 12/1961 | Rogers et al. _______ 26—63 X |
| 3,120,492 | 2/1964 | Peterson __________ 210—401 |

FOREIGN PATENTS 207,240   3/1957   Australia.

REUBEN FRIEDMAN, *Primary Examiner.*

HERBERT L. MARTIN, *Examiner.*